(12) United States Patent
Dial

(10) Patent No.: US 9,150,085 B2
(45) Date of Patent: Oct. 6, 2015

(54) SLIDING DOOR ASSIST DEVICE

(75) Inventor: Timothy W. Dial, Brandon, MS (US)

(73) Assignee: Nissan North America, Inc., Franklin, TN (US)

(*) Notice: Subject to any disclaimer, the term of this patent is extended or adjusted under 35 U.S.C. 154(b) by 828 days.

(21) Appl. No.: 13/396,437

(22) Filed: Feb. 14, 2012

(65) Prior Publication Data

US 2013/0185931 A1 Jul. 25, 2013

Related U.S. Application Data

(60) Provisional application No. 61/590,237, filed on Jan. 24, 2012.

(51) Int. Cl.
*B25B 27/14* (2006.01)
*B60J 5/06* (2006.01)
*B66C 23/48* (2006.01)

(52) U.S. Cl.
CPC . *B60J 5/06* (2013.01); *B66C 23/48* (2013.01); *E05Y 2600/00* (2013.01); *E05Y 2800/692* (2013.01); *E05Y 2900/531* (2013.01); *Y10T 29/53* (2015.01)

(58) Field of Classification Search
USPC .................................................. 29/281.1
See application file for complete search history.

(56) References Cited

U.S. PATENT DOCUMENTS

| | | | | |
|---|---|---|---|---|
| 3,030,103 A * | 4/1962 | Allen et al. | ............... | 269/17 |
| 3,338,556 A * | 8/1967 | Sluse | ............... | 254/134 |
| 4,029,308 A * | 6/1977 | Mathers | ............... | 269/17 |
| 4,180,252 A * | 12/1979 | Cushenbery | ............... | 269/17 |
| 4,183,511 A * | 1/1980 | Marek | ............... | 269/17 |
| 4,767,046 A * | 8/1988 | Kumagai et al. | ............... | 228/4.1 |
| 5,129,134 A * | 7/1992 | St. Angelo et al. | ............... | 29/281.1 |
| 5,135,205 A * | 8/1992 | Bedard | ............... | 269/17 |
| 5,269,501 A * | 12/1993 | Liegel et al. | ............... | 269/17 |
| 5,915,742 A * | 6/1999 | Hung | ............... | 29/281.5 |
| 6,024,348 A * | 2/2000 | Ventura et al. | ............... | 269/17 |
| 6,122,813 A * | 9/2000 | Roy et al. | ............... | 29/407.09 |
| 6,490,906 B1 * | 12/2002 | Bailey | ............... | 72/457 |
| 7,008,165 B1 * | 3/2006 | Grimes | ............... | 414/589 |
| 7,008,166 B1 * | 3/2006 | Grimes | ............... | 414/663 |
| 7,036,210 B2 * | 5/2006 | Jung | ............... | 29/714 |
| 8,046,895 B2 * | 11/2011 | Sherrill et al. | ............... | 29/468 |
| 8,132,310 B2 * | 3/2012 | Suga et al. | ............... | 29/281.1 |
| 8,172,210 B2 * | 5/2012 | Jeon | ............... | 269/21 |
| 8,322,005 B2 * | 12/2012 | Buse et al. | ............... | 29/235 |
| 8,485,575 B2 * | 7/2013 | Yeum | ............... | 294/81.6 |
| 8,770,561 B2 * | 7/2014 | Gagnon, Jr. | ............... | 269/9 |
| 8,851,461 B2 * | 10/2014 | Jang | ............... | 269/55 |

* cited by examiner

*Primary Examiner* — Lee D Wilson
*Assistant Examiner* — Alvin Grant
(74) *Attorney, Agent, or Firm* — Global IP Counselors, LLP

(57) ABSTRACT

A sliding door assist device includes a guided cart attachment structure, a retracting structure and a door support structure. The retracting structure is pivotally coupled to the guided cart attachment structure to move between an extended position and a stowed position with respect to the guided cart attachment structure. The door support structure is coupled to the retracting structure such that the door support structure moves with the retracting structure with respect to the guided cart attachment structure between the extended position and the stowed position. The door support structure is configured to support a sliding door in a prescribed open position with the retracting structure in the extended position.

19 Claims, 15 Drawing Sheets

SLIDING DOOR ASSIST DEVICE

CROSS-REFERENCE TO RELATED APPLICATIONS

This application claims priority to U.S. Provisional Application No. 61/590,237, filed on Jan. 24, 2012. The entire disclosure of U.S. Provisional Application No. 61/590,237 is hereby incorporated herein by reference in its entirety.

BACKGROUND

1. Field of the Invention

The present invention generally relates to a sliding door assist device. More specifically, the present invention relates to a sliding door assist device that can support a vehicle sliding door during installation of the sliding door.

2. Background Information

Large vans, such as family vehicle vans and commercial vans, typically include a sliding door on at least one side thereof. The sliding door is designed to slide along a plurality of tracks defined on or attached to a vehicle body structure. Most vehicle body structures that receive a sliding door include three separate tracks to support the sliding door. The sliding door is initially usually attached to two tracks, and after various installation tasks are completed, the sliding door is then attached to the third track. Prior to attachment to the third track, the sliding door must be supported. Since the sliding door is large and difficult to maneuver during installation, and since the sliding door can be damaged if not handled carefully, care must be taken when supporting the sliding door in a partially installed state.

SUMMARY

One object is to provide a mechanism that can support a sliding door during installation to a vehicle body structure.

Another object is to provide support for a sliding door during installation of the sliding door that allows free access to both inner and outer sides of the sliding door.

In view of the state of the known technology, one aspect of the present disclosure is to provide a sliding door assist device that includes a guided cart attachment structure, a retracting structure and a door support structure. The retracting structure is pivotally coupled to the guided cart attachment structure to move between an extended position and a stowed position with respect to the guided cart attachment structure. The door support structure is coupled to the retracting structure such that the door support structure moves with the retracting structure with respect to the guided cart attachment structure between the extended position and the stowed position. The door support structure is configured to support a sliding door in a prescribed open position with the retracting structure in the extended position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
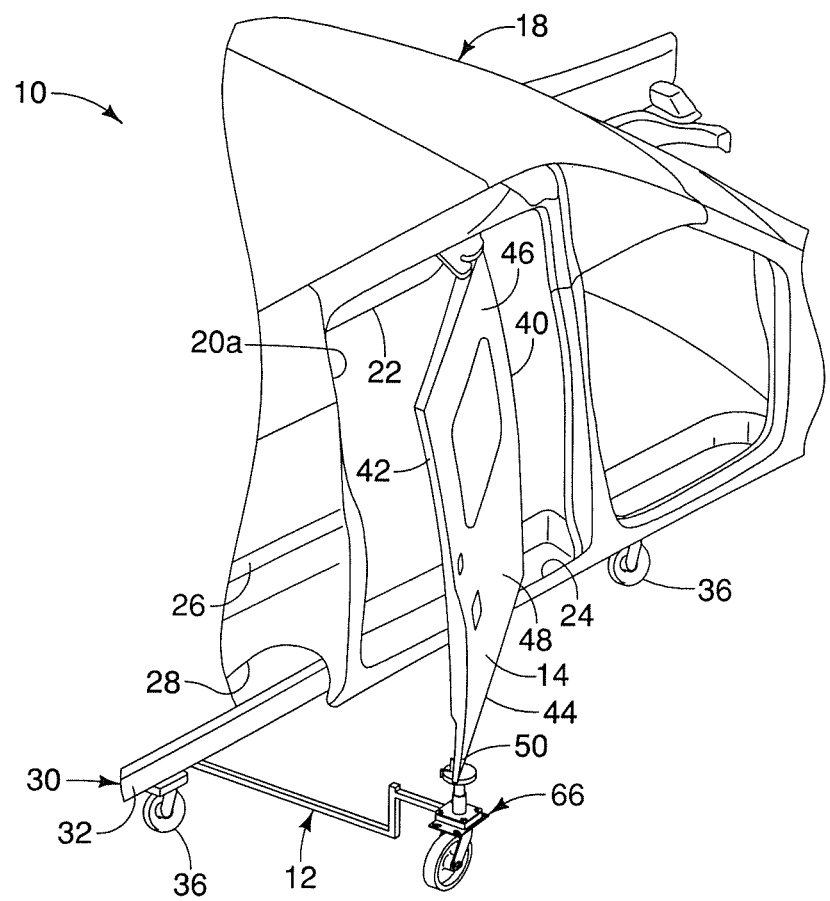
FIG. 1 is a perspective view of a vehicle structure at one stage of assembly in a manufacturing assembly line, the vehicle structure being supported by a guided cart of the assembly line with a sliding door assist device supporting a rear end of a sliding door being installed in accordance with one embodiment.

Referring initially to FIG. 1, a vehicle 10 in a partially assembled state is illustrated in accordance with a first embodiment. A sliding door assist device 12 is also shown in FIG. 1 supporting a sliding door 14 as the sliding door 14 is installed to the vehicle 10. A description of the sliding door assist device 12 is provided below, after a brief description of the vehicle 10.

The vehicle 10 is basically a van or commercial vehicle that includes a vehicle structure 18 defining a pair of sliding door openings 20a and 20b, one on each lateral side of the vehicle 10. A separate sliding door 14 is subsequently installed in each of the sliding door openings 20a and 20b. Alternatively, the vehicle structure 18 can also be manufactured with a single sliding door opening, having only one sliding door 14. However, in the depicted embodiment, there are two sliding door openings 20a and 20b as one example of the vehicle structure 18. The sliding door openings 20a and 20b are essentially identical to one another, except that they are mirror images of one another. Hence, the description below of only one of the sliding door openings 20a and 20b and one sliding door 14 applies to both sliding door openings 20a and 20b and one sliding door 14, for the sake of brevity.

As shown in FIG. 1, the vehicle structure 18 includes a first track 22, a second track 24 and a third track 26. The first track 22 is located at an upper region the vehicle structure 18 within the door opening 20a. The second track 24 is located at a lower region of the vehicle structure within the door opening 20a. The third track 26 is located along the outer side of the vehicle structure 18, extending rearward from the sliding door opening 20a. The vehicle structure 18 also includes rear wheel wells 28, as shown in FIGS. 1 and 2.

The vehicle 10 and the vehicle structure 18 include a variety of additional features and components. However, these features and components are peripheral to the sliding door assist device 12. Therefore further description is omitted for the sake of brevity.

The vehicle 10 is shown in FIGS. 1-7 at various stages of assembly in an assembly line within a factory (not shown). While in the assembly line, the vehicle 10 is supported on a guided cart 30 that is movable from one station to another station along the assembly line. The guided cart 30 is a wheeled structure with a frame that supports the vehicle body structure 18 for movement from one station to the next along the assembly line. At each station along the assembly line, one or more components of the vehicle 10 is installed to the vehicle structure 18. In FIGS. 1-7, the sliding door 14 is shown in various stages of installation.

Figure 2:
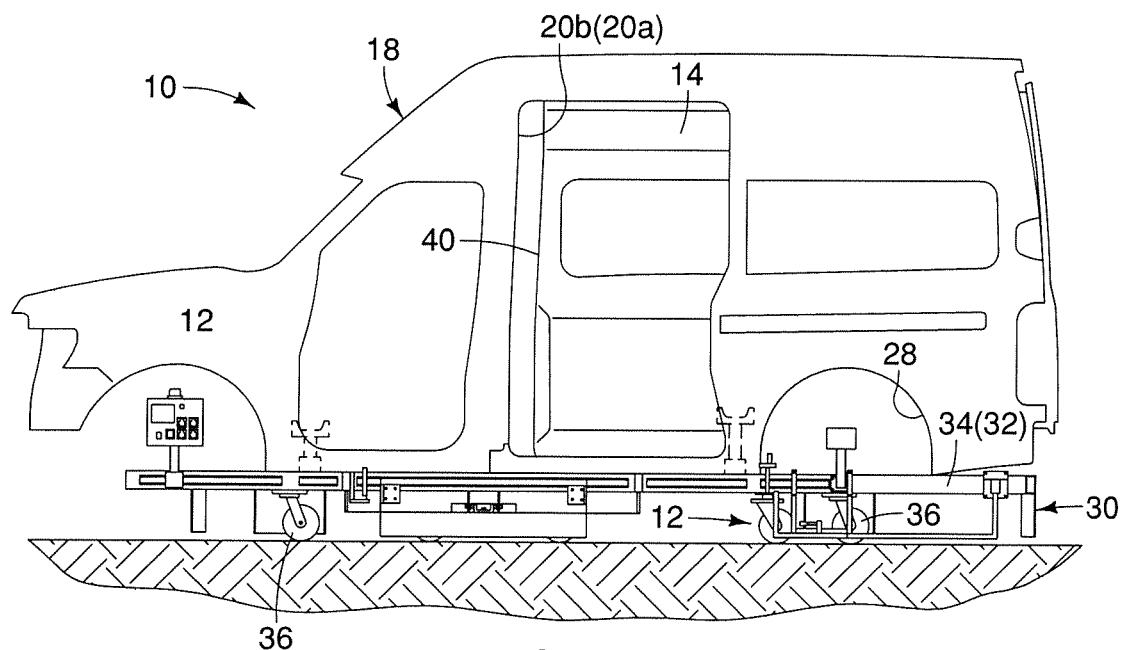
FIG. 2 is a side view of the vehicle structure shown supported by the guided cart with the sliding door assist device partially hidden by the guided cart in accordance with the one embodiment.
Figure 3:
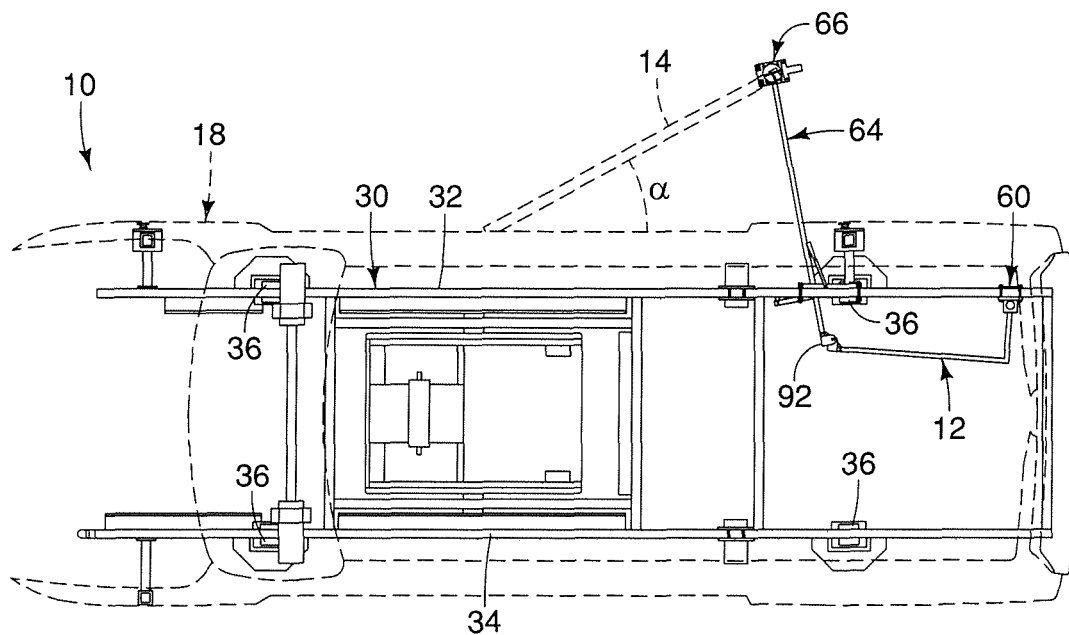
FIG. 3 is a top view of the vehicle structure showing the sliding door partially installed, with the sliding door being supported by the sliding door assist device offset from the vehicle structure by an acute angle, the sliding door assist device being in an extended position in accordance with the one embodiment.
Figure 4:
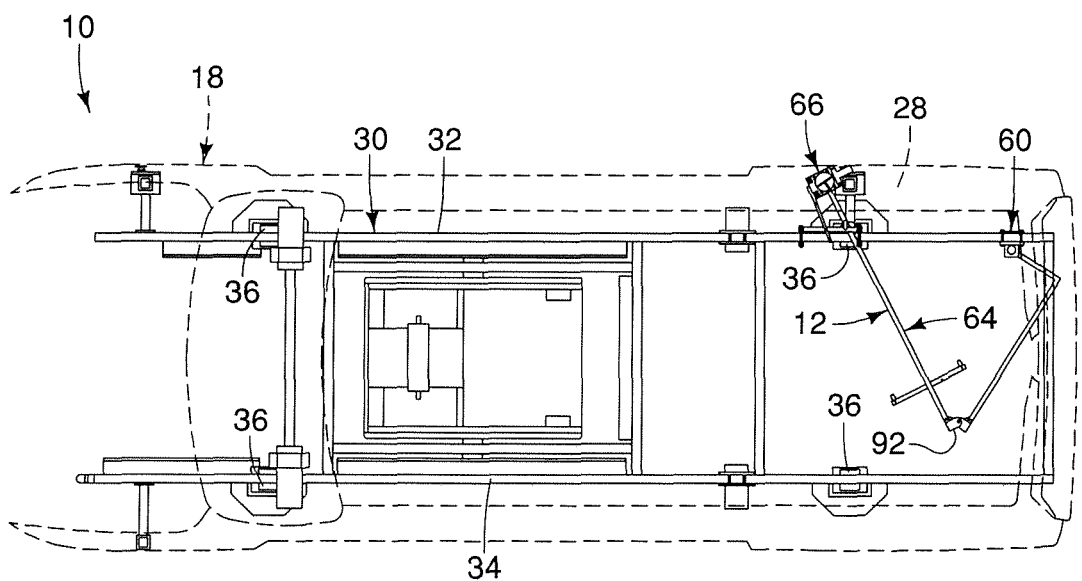
FIG. 4 is a top view of the vehicle structure showing the sliding door fully installed with the sliding door assist device in a retracted position under the vehicle structure in accordance with the one embodiment.

As shown in FIGS. 2, 3 and 4, the guided cart 30 is basically a wheel supported frame that includes a pair of support beams 32 and 34 and a plurality of casters or wheels 36. The support beams 32 and 34 extend in a longitudinal direction relative to the vehicle structure 18, and beneath the vehicle structure 18. More specifically, the support beams 32 and 34 extend under opposite side sections of the vehicle structure 18, supporting the vehicle structure 18 as it moves along the assembly line. The wheels 36 are coupled to an underside of the support beams 32 and 34 to support the vehicle structure 18 for rolling movement along the assembly line. The guided cart 30 includes various other features that are peripheral to the sliding door assist device 12, and therefore further description of the guided cart 30 is omitted for the sake of brevity.

Figure 5:
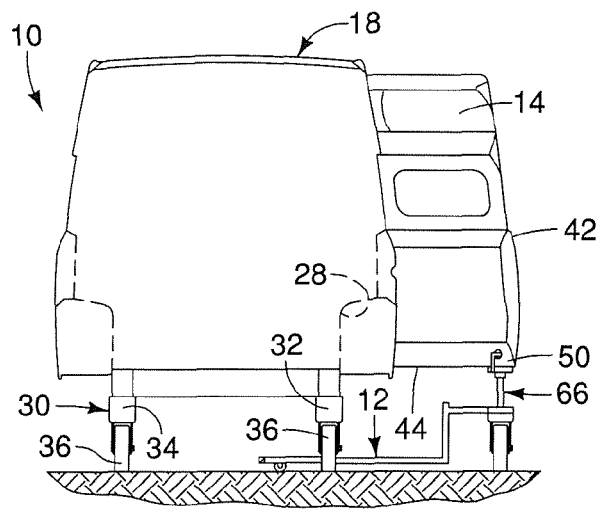
FIG. 5 is a rear view of the vehicle structure showing the sliding door partially installed with the sliding door being supported by the sliding door assist device, the sliding door assist device being in the extended position in accordance with the one embodiment.

As shown in FIG. 1, the sliding door 14 includes a forward edge 40, a rearward edge 42, a lower edge 44, an upper front corner section 46, a lower front corner section 48 and a lower rear corner section 50. As shown in FIGS. 2, 3 and 5, when the sliding door 14 is installed on the vehicle structure 18, sliding door supports (not shown) at the upper front corner section 46 and the lower front corner section 48 of the sliding door 14 are installed to respective ones of the first track 22 and the second track 24. The sliding door 14 is brought to the vehicle structure 18 in a conventional manner, and installed to the vehicle structure 18.

Assembly line technicians perform several installation related tasks with the sliding door 14 angled out from the sliding door opening 20a, as shown in FIGS. 1, 3 and 5, with only the forward edge 40 of the sliding door 14 being supported by the vehicle structure 18. While the assembly line technicians are performing their tasks, the sliding door 14 is supported by the sliding door assist device 12 at an angle α, as shown in FIG. 3. The angle α is preferably approximately 35°, but may vary plus or minus 5° depending upon the overall design of the sliding door 14 and the vehicle structure 18. With the rearward edge 42 of the sliding door 14 angled away from the vehicle structure 18, the assembly line technicians can move along both the interior and exterior surfaces of the sliding door 14 to complete their installation related tasks. After their installation related tasks are completed, a third door support (not shown) located adjacent a mid-section of the rearward edge 42 of the sliding door 14 can be installed to the third track 26, such that the sliding door 14 can slide along the first, second and third tracks 22, 24 and 26 between an open orientation and a closed orientation.

The sliding door assist device 12 makes it possible for the assembly line technicians to move freely around both the interior and exterior surfaces of the sliding door 14, with the door angled away from the vehicle structure 18. Specifically, the sliding door assist device 12 supports the lower edge 44 of the sliding door 14 proximate the rearward edge 42 of the sliding door 14. The sliding door assist device 12 occupies a minimal amount of space under and around the sliding door 14 and the vehicle structure 18. Consequently, movement around both interior and exterior surfaces of the sliding door 14 is easier and unobstructed.

Figure 6:
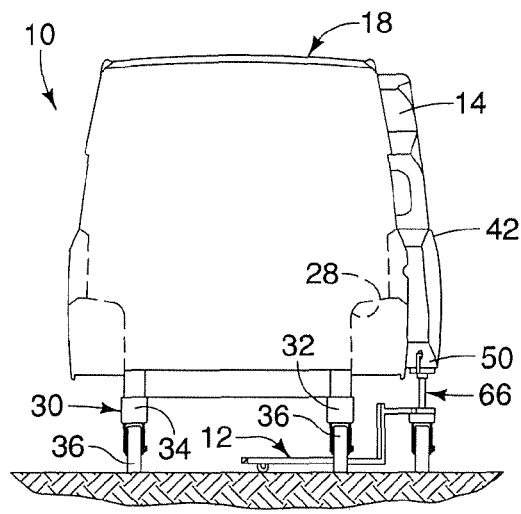
FIG. 6 is a rear view of the vehicle structure showing the sliding door partially installed with the sliding door being supported by the sliding door assist device, the sliding door assist device being in an intermediate position between the extended position and the retracted position in accordance with the one embodiment.

The sliding door assist device 12 is an assembly that is separate from the guided cart 30, but can be installed easily to the guided cart 30. The sliding door assist device 12 is configured such that it can move between an extended position shown in FIGS. 1, 3, 5, 9, and 11, and a stowed position under the vehicle structure 18 and portions of the guided cart 30, as shown in FIGS. 4, 7, 8 and 10. FIG. 6 shows the sliding door assist device 12 in an intermediate position between the extended position and the stowed position.

Figure 8:
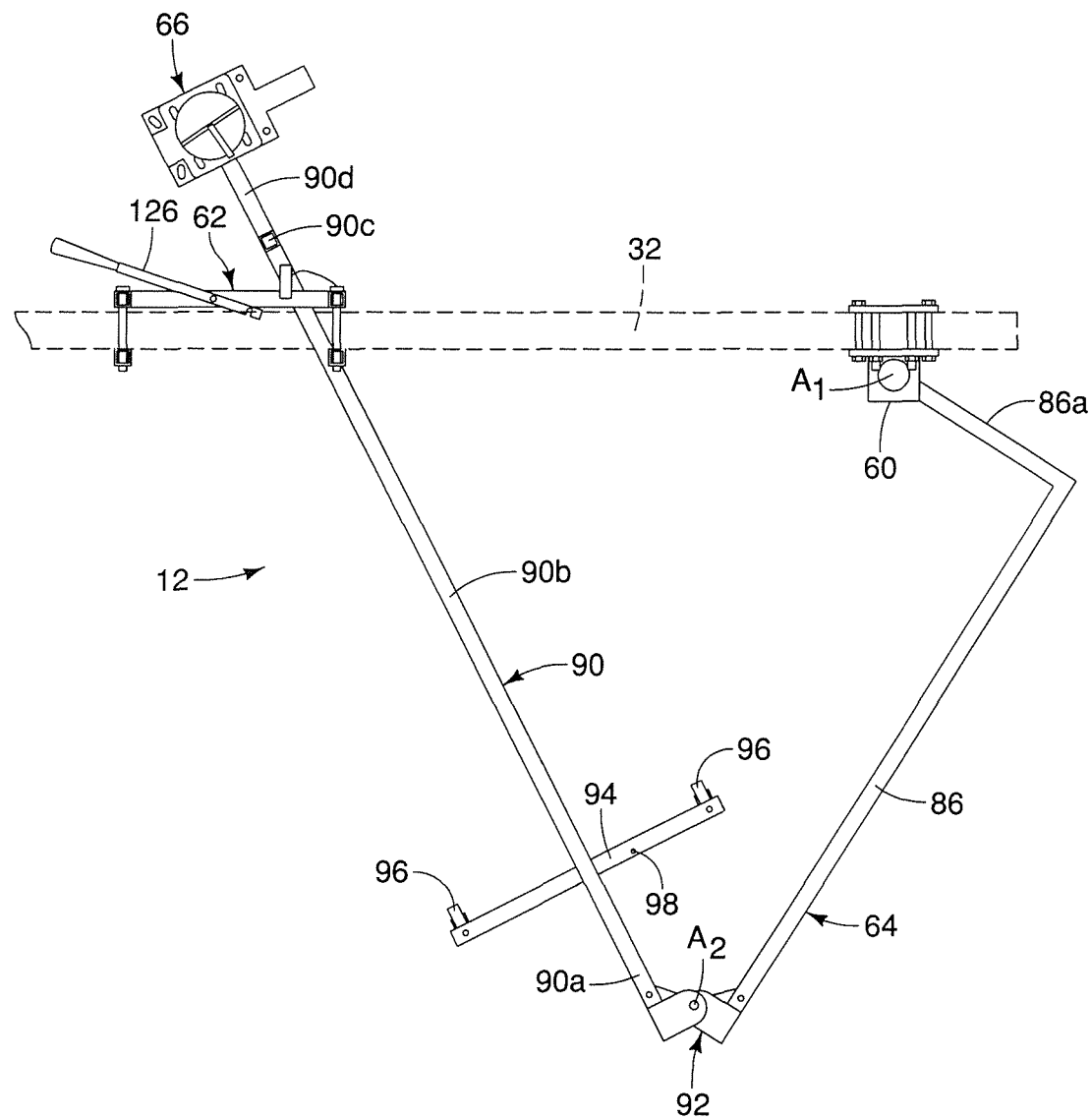
FIG. 8 is a top view of the sliding door assist device with the vehicle structure removed and only a single side support beam of the guided cart depicted in phantom in order to show details of the sliding door assist device in the retracted position in accordance with the one embodiment.
Figure 9:
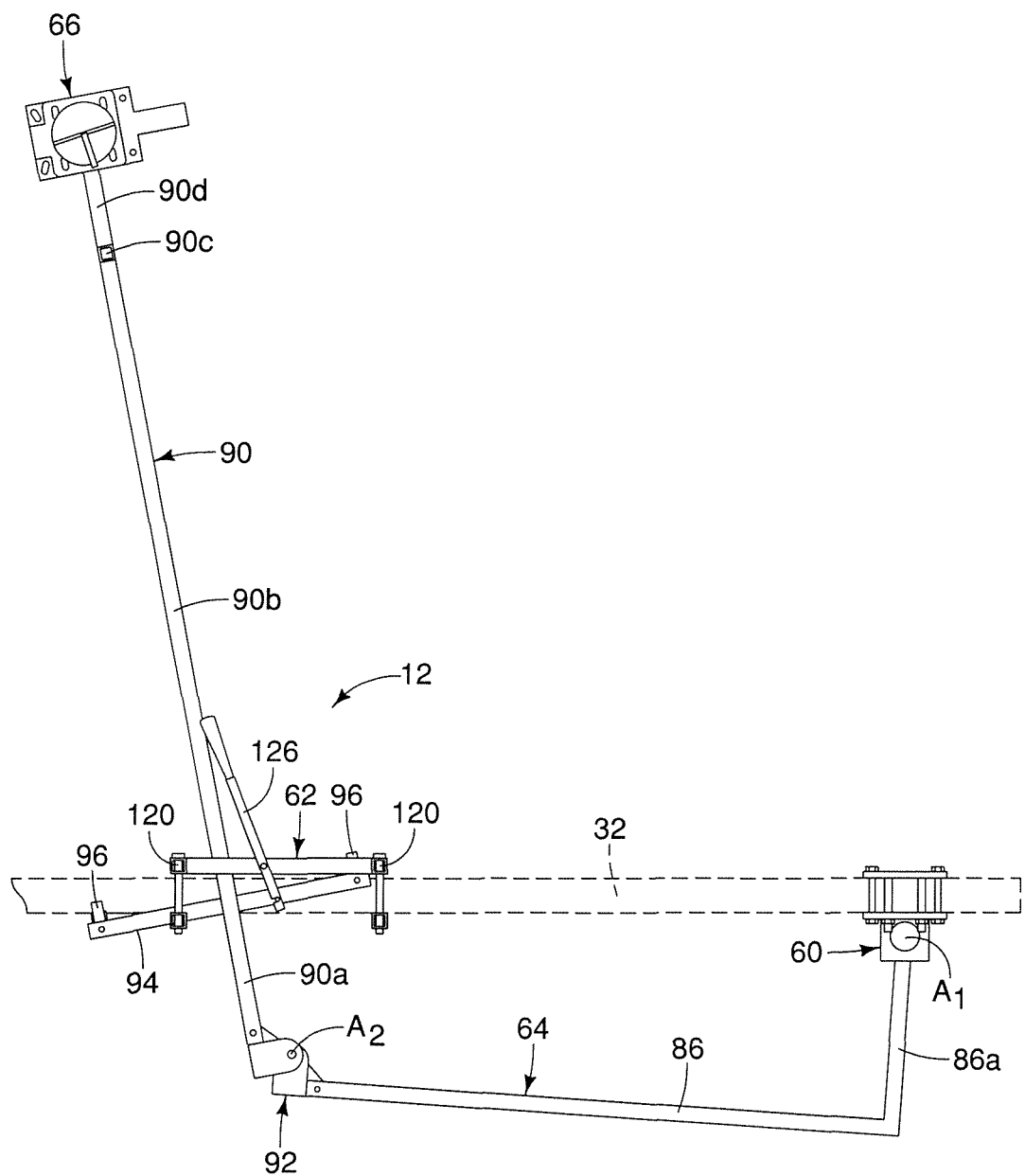
FIG. 9 is another top view of the sliding door assist device similar to FIG. 8, showing the sliding door assist device in the extended position in accordance with the one embodiment.

A description of the sliding door assist device 12 is now provided with initial reference to FIGS. 8 and 9. The sliding door assist device 12 basically includes with a first support beam attachment part 60, a second support beam attachment part 62, a retracting structure 64, and a door support structure 66.

The first support beam attachment part 60 and the second support beam attachment part 62 together define a guided cart attachment structure. Specifically, each of the first support beam attachment part 60 and the second support beam attachment part 62 is configured and arranged to clamp on to the support beam 32 or the support beam 34. Further, two separate ones of the sliding door assist device 12 can be employed. One sliding door assist device 12 can be installed to the support beam 32 and another sliding door assist device 12 can be installed to the support beam 34. Only one sliding door assist device 12 is described herein below. However it should be understood from the drawings and the description herein that two separate sliding door assist devices 12 can be employed, installed to opposite sides of the guided cart 30.

Figure 13:
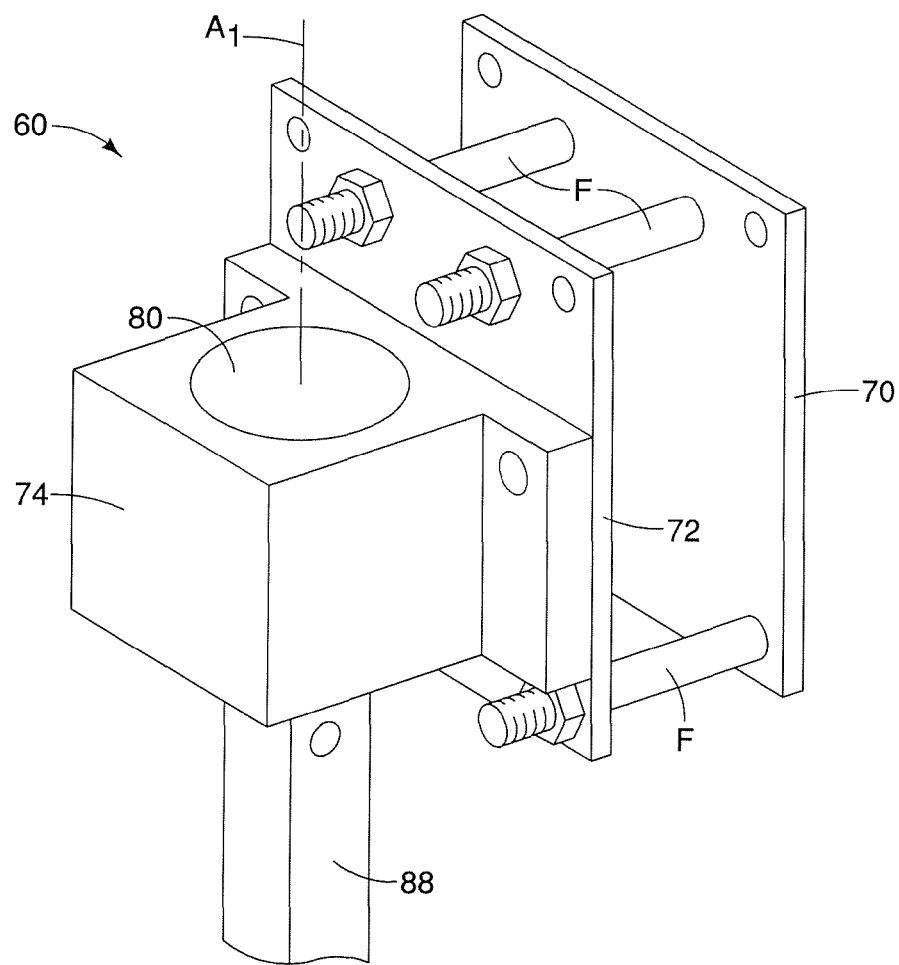
FIG. 13 is a perspective view of a first support beam attachment part of a guided cart attachment structure of the sliding door assist device in accordance with the one embodiment.
Figure 14:
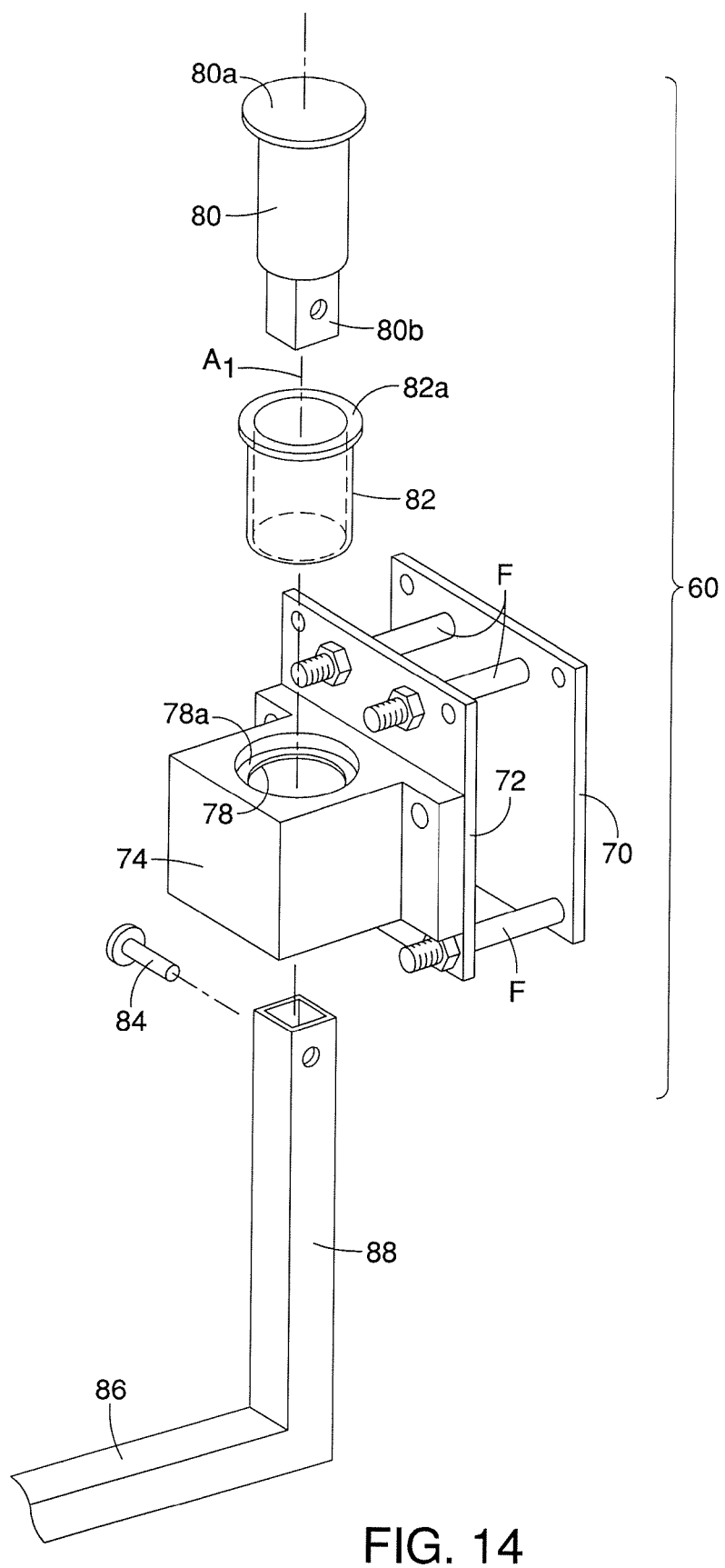
FIG. 14 is an exploded perspective view of the first support beam attachment part of the guided cart attachment structure of the sliding door assist device in accordance with the one embodiment.

The first beam attachment part 60 is shown in FIGS. 13 and 14. The first beam attachment part 60 includes a first clamping plate 70, a second clamping plate 72 and a pivot block 74. The first and second clamping plates 70 and 72 are dimensioned to fit on opposite sides of the support beam 32 (as indicated in FIGS. 8-11). Fasteners F extend between the first and second clamping plates 70 and 72. The fasteners F can be tightened drawing the first and second clamping plates 70 and 72 toward one another such that the first and second clamping plates 70 and 72 fixedly clamp on to the support beam 32.

The pivot block 74 is fixedly attached to the second clamping plate 72 by, for example, a series of fasteners or welding. As shown in FIG. 14, the pivot block 74 defines a central bore 78 with a recess 78a, and further includes a shaft member 80, a bushing 82 and an attachment pin 84. As shown in FIGS. 13 and 14, the central bore 78 defines a first pivot axis $A_1$.

The shaft member 80 has an enlarged upper end 80a and a lower squared end 80b. The upper end 80a of the shaft member 80 is dimensioned to contact an upper end 82a of the bushing 82 such that the shaft member 80 can pivot relative to the bushing 82 and the pivot block 74. The lower squared end 80b of the shaft member 80 is dimensioned to fit into an open end of a beam section 88 of the retracting structure 64, described in greater detail below. The attachment pin 84 is inserted into apertures in the beam section 88 and further extend through a bore in the lower squared end 80b of the shaft member 80 (with the lower squared end 80b inserted into the beam section 88), thereby retaining the shaft member 80 to the beam section 88. The central bore 78 of the pivot block 74 and the shaft member 80 define a first pivot arrangement that provides the retracting structure 64 with pivotal movement about the first pivot axis $A_1$.

The bushing 82 is dimensioned to be press-fitted into the central bore 78 of the pivot block 74. The upper end 82a of the bushing 82 is dimensioned to fit within the recess 78a. The hollow interior of the bushing 82 and upper end 82a of the bushing 82 provide bearing surfaces against which the shaft member 80 can pivotally contact. As indicated in FIG. 13, the shaft member 80 defines a first pivot axis $A_1$.

The second support beam attachment part 62 is described in greater detail below after a description of the retracting structure 64.

The retracting structure 64 is pivotally coupled to the guided cart 30 via the first support beam attachment part 60 (and the pivot block 74) to move between the extended position (FIGS. 1, 3, 5, 9 and 11) and the stowed position (FIGS. 4, 7, 8 and 10). As shown in FIGS. 8-11, the retracting structure 64 includes a first beam 86 that includes the beam section 88, a second beam 90 and a hinge structure 92.

The first beam 86 includes the beam section 88, which extends vertically upward from an angularly offset section 86a of the first beam 86. The angularly offset section 86a is provided to horizontally space the beam section 88 apart from the first support beam attachment part 60. The beam section 88 is rigidly and fixedly connected to the offset section 86a by, for instance, welding. An upper end (or first end) of the beam section 88 is connected to the pivot block 74, as described above. Hence, the retracting structure 64 is pivotally coupled to the first support beam attachment part 60 by the first pivot arrangement (the central bore 78 of the pivot block 74 and the shaft member 80) for pivotal movement about a first pivot axis $A_1$.

As shown in FIGS. 8-11, the second beam 90 of the retracting structure 64 includes a first end 90a, a main section 90b, a vertical section 90c and a second end 90d. The first end 90a is pivotally coupled to the first beam 86 by the hinge structure 92. The main section 90b extends generally horizontally between the first end 90a and the vertical section 90c. The vertical section 90c has a lower end that is rigidly fixed to the main section 90b of the second beam 90, and an upper end rigidly fixed to the second end 90d, by for example, welding. As best shown in FIG. 12, the main section 90b of the second beam 90 is generally horizontally oriented. The vertical section 90c is perpendicular to the main section 90b, extending vertically. The second end 90d of the second beam 90 is horizontally oriented, extending from the vertical section 90c in a direction opposite from the main section 90b. The second end 90*d* of the second beam 90 is connected to the door support structure 66 by, for example, welding.

The main section 90*b* of the second beam 90 also includes a support member 94 that extends perpendicular to the main section 90*b*. The support member 94 is rigidly fixed by, for example, welding, to the main section 90*b*. The support member 94 includes casters 96. The casters 96 provide rolling support to the retracting structure 64. In particular, the casters 96 provide rolling support directly to the support beam 90 and the hinge structure 92, and in part to the first beam 86. The support member 94 and the casters 96 are located closer to the first end 90*a* of the second beam 90 than to the second end 90*d* of the second beam 90. The support member 94 also includes a locking pin 98 that extends upward from an upper surface of the support member. The locking pin 98 defines part of a locking structure that is described in greater detail below.

It should be understood from the drawings and the description herein that the first support beam attachment part 60 being clamped to the support beam 32, is fully supported by the guided cart 30. The first support beam attachment part 60 is basically clamped to the support beam 32. Further, the first beam 86 (via the beam section 88) is partially supported by the first support beam attachment part 60 and the support beam 32 because the first beam 86 essentially hangs downward from the first support beam attachment part 60. Hence, sections of the retracting structure 64 are supported mainly by the support member 94 and the casters 96, partially supported by the first support beam attachment part 60, and partially supported by the door support structure 66, as described further below.

Figure 15:
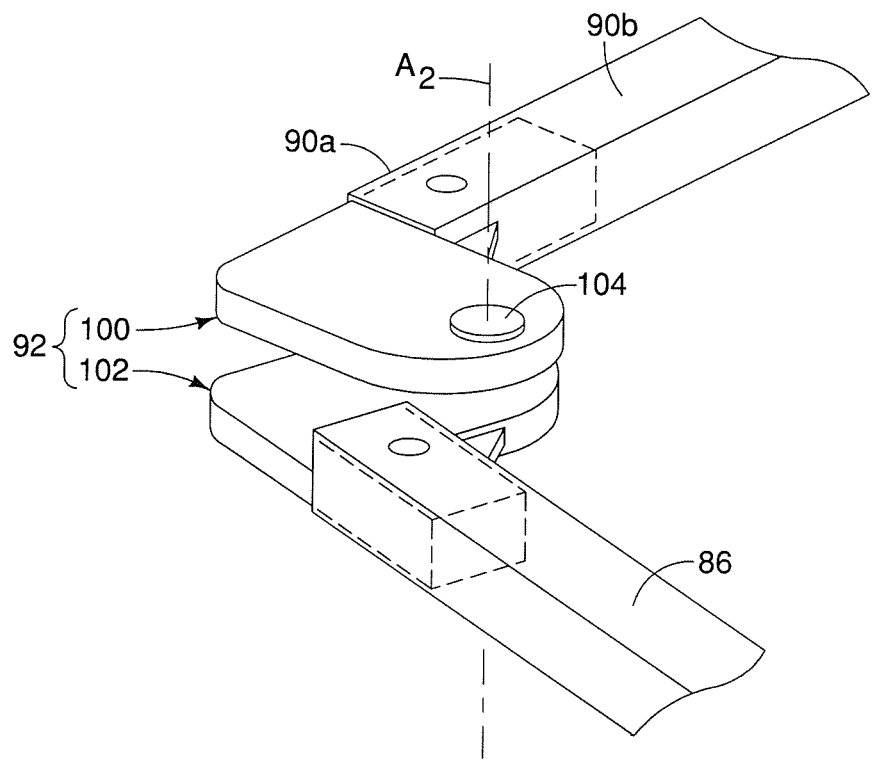
FIG. 15 is a perspective view of a hinge structure of the sliding door assist device in accordance with the one embodiment.
Figure 16:
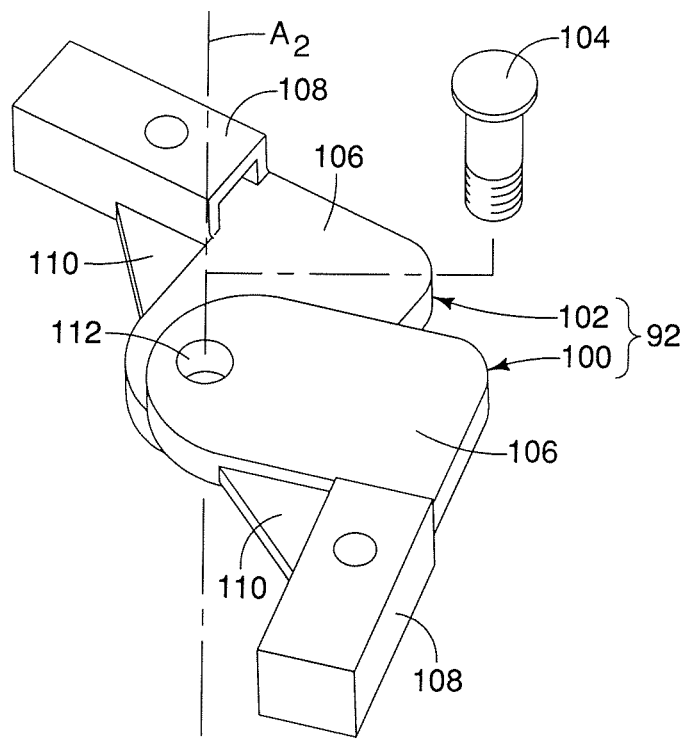
FIG. 16 is another perspective view of a hinge structure of the sliding door assist device from a reverse angle, shown with beams of the sliding door assist device removed to show details of the hinge structure in accordance with the one embodiment.

A description of the hinge structure 92 (a second pivot arrangement) is now provided with specific reference to FIGS. 15 and 16. The hinge structure 92 includes a first part 100, a second part 102 and a pivot shaft 104. The first part 100 and second part 102 are basically the same, with one flipped and overlapping the other. Specifically, each of the first part 100 and the second part 102 includes a pivot plate section 106, an attachment block 108 and a support bracket 110. The pivot plate sections 106 of the first and second parts 102 are dimensioned to overlap. Each includes a bore 112 dimensioned to receive the pivot shaft 104. The attachment block 108 of the first part 100 is connected via a fastener or welding to the first end 90*a* of the second beam 90, and the attachment block 108 of the second part 102 is connected via a fastener to the first beam 86, as shown in FIG. 15. The support bracket 110 is welded to the attachment block 108 or the respective beam 86, 90 and the pivot plate section 106 to provide required strength and stiffness to the hinge structure 92.

The bores 112 of the hinge structure 92 define a second pivot axis $A_2$. Hence, the second beam 90 pivots relative to the first beam 86 about the second pivot axis $A_2$. The first pivot axis $A_1$ and the second pivot axis $A_2$ are arranged parallel to one another.

A detailed description of the second support beam attachment part 62 is now provided with specific reference to FIGS. 10, 11 and 17-19. The second support beam attachment part 62 includes a pair of spaced apart upright members 120, a pair of clamping members 122, a lower cross-member 124 and a lever 126. The pair of spaced apart upright members 120 and the lower cross-member 124 form a rigid H-shaped structure. More specifically, the lower cross-member 124 is horizontally oriented such that opposite ends of the lower cross-member 124 are, for example, welded to the upright members 120. Lower ends 120*a* of each of the upright members 120 extend downward below the lower cross-member 124.

Figure 10:
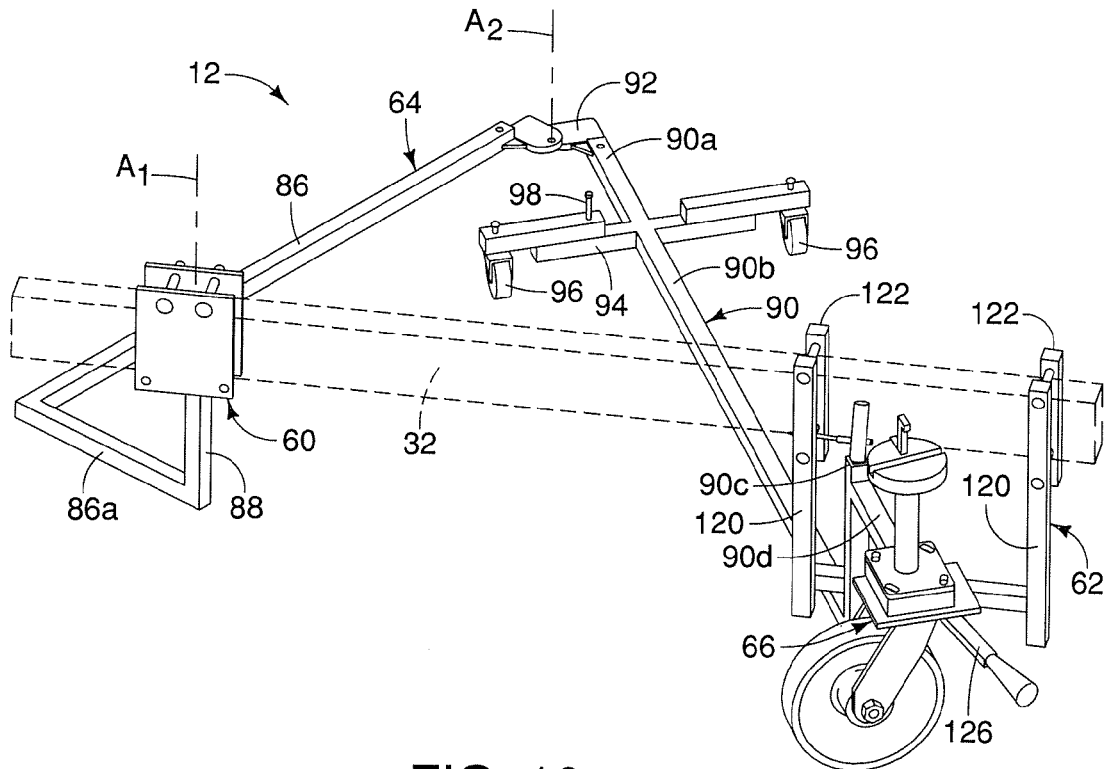
FIG. 10 is a perspective view of the sliding door assist device with the vehicle structure removed and only a single side support beam of the guided cart depicted in phantom in order to show details of the sliding door assist device in the retracted position in accordance with the one embodiment.
Figure 11:
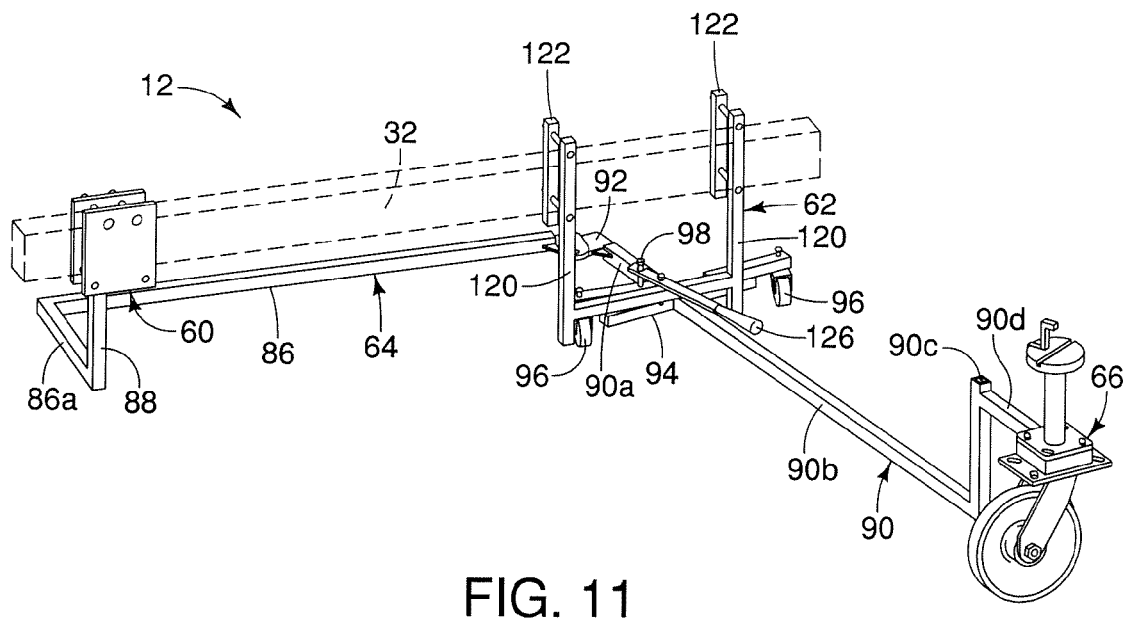
FIG. 11 is another perspective view of the sliding door assist device similar to FIG. 10, showing the sliding door assist device in the extended position in accordance with the one embodiment.
Figure 12:
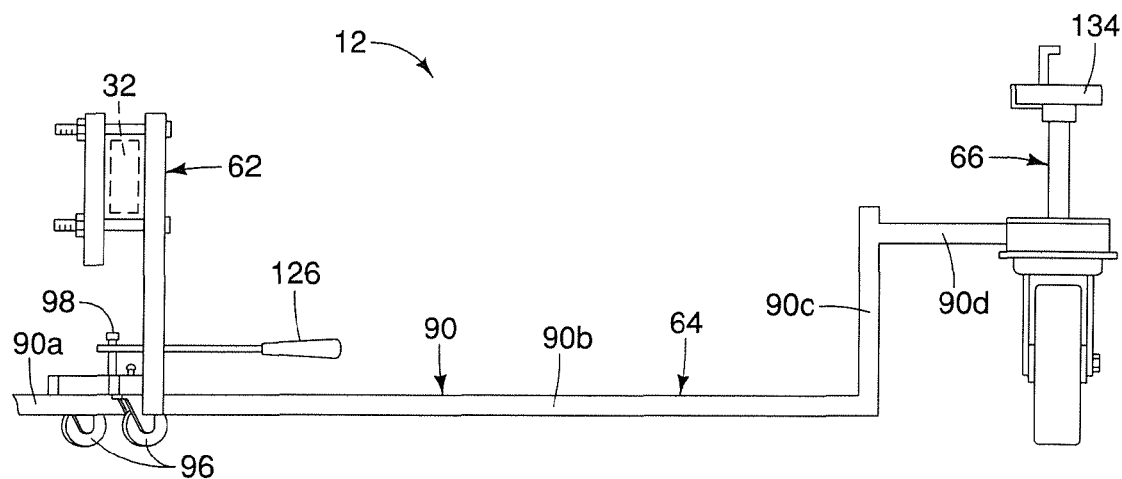
FIG. 12 is a side view of the sliding door assist device showing a portion of the sliding door assist device in the extended position in accordance with the one embodiment.

Each of the pair of clamping members 122 and corresponding ones of the upright members 120 are configured to clamp onto a section of the support beam 32 of the guided cart 30, as indicated in FIGS. 10 and 11. The clamping members 122 are attached to the upright members 120 by fasteners F, as shown in FIGS. 17-19.

Figure 17:
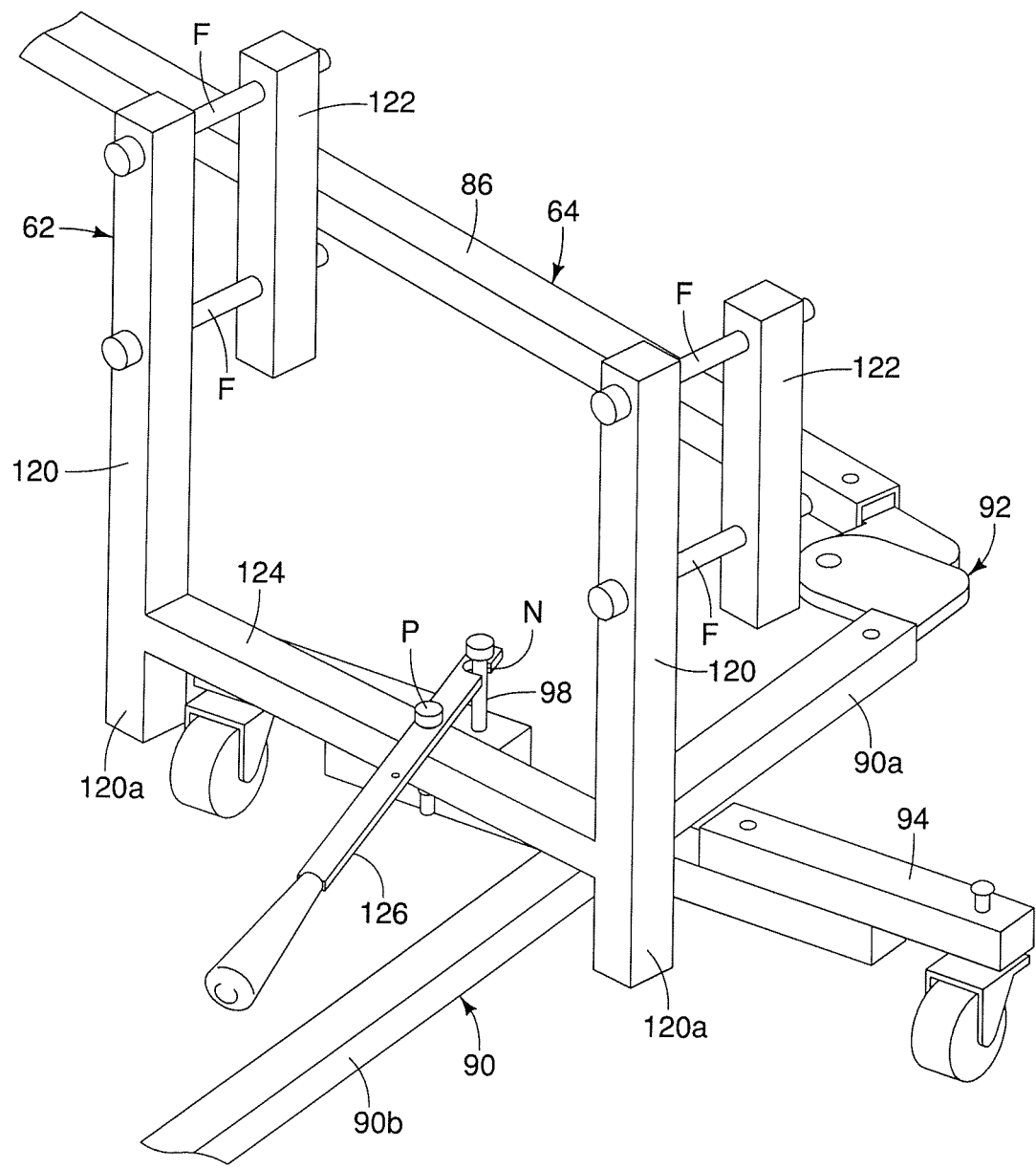
FIG. 17 is a perspective view of a second support beam attachment part of the guided cart attachment structure of the sliding door assist device, showing a locking structure that maintains the sliding door assist device in the extended position in accordance with the one embodiment.
Figure 18:
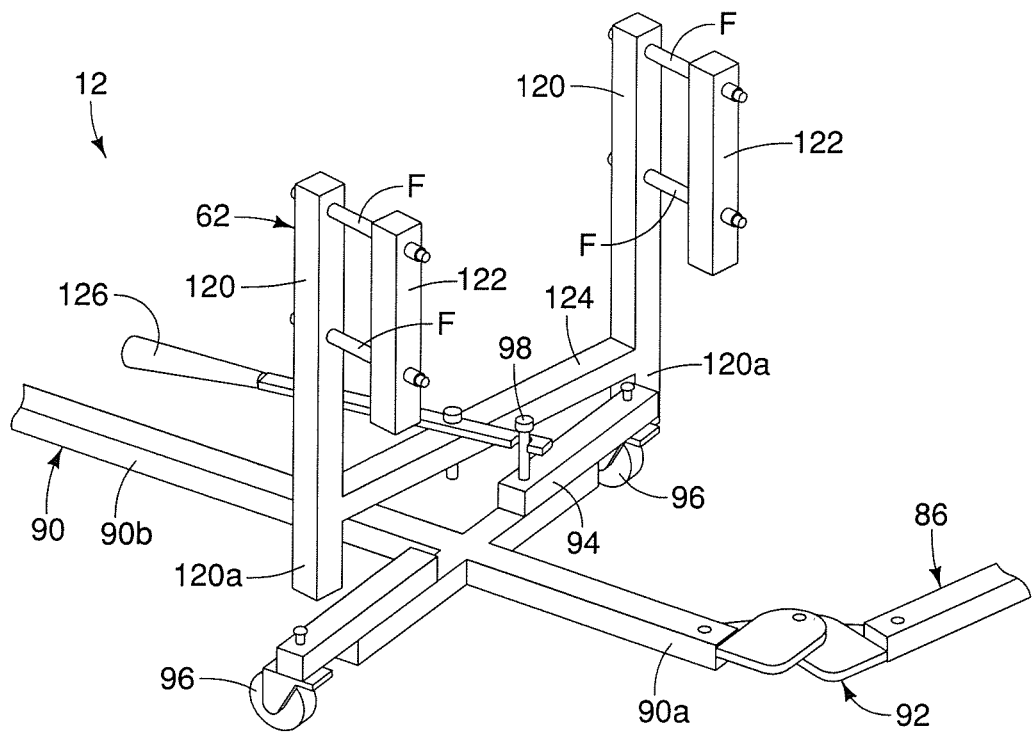
FIG. 18 is another perspective view of the second support beam attachment part of the guided cart attachment structure of the sliding door assist device, showing the locking structure from a different angle in accordance with the one embodiment.
Figure 19:
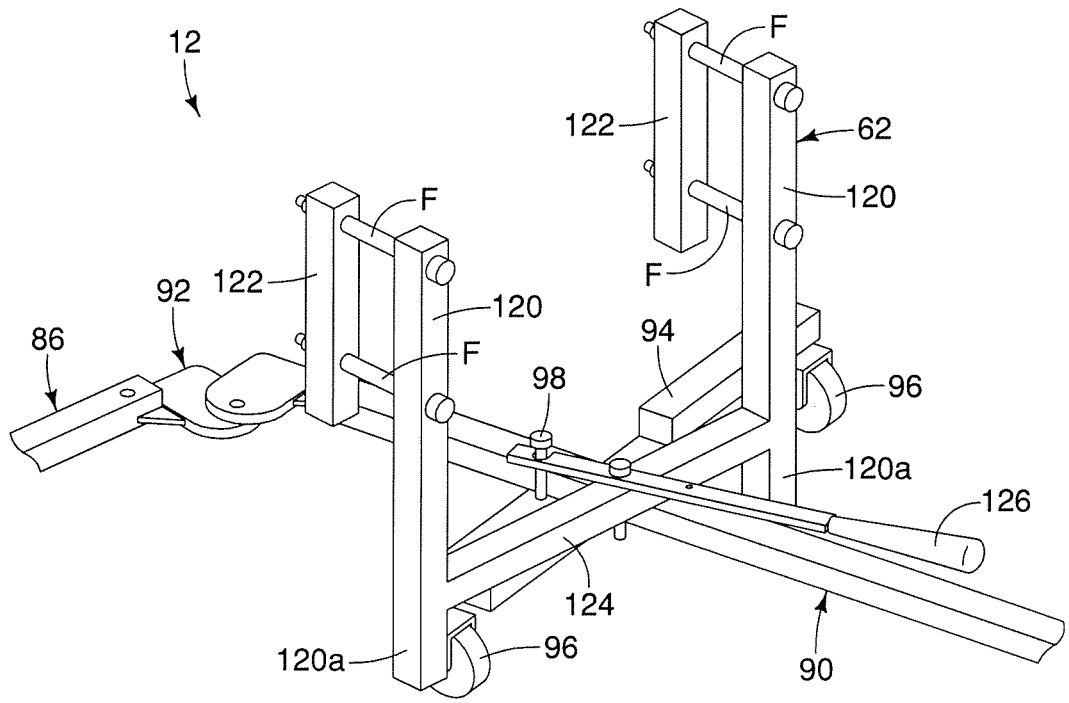
FIG. 19 is yet another perspective view of the second support beam attachment part of the guided cart attachment structure of the sliding door assist device, showing the locking structure from another angle in accordance with the one embodiment.

The lever 126 is attached for pivotal movement to the lower cross-member 124, as shown in FIGS. 17-19. The lever 126 extends in a generally horizontal direction and pivots about a pivot pin P, shown in FIG. 17. The lever 126 of the second support beam attachment part 62, and the locking pin 98 on the support member 94 of the second beam 90 of the retracting structure 64 define a locking structure.

More specifically, the locking structure includes the locking pin 98 located on the retracting structure 64 and the lever 126 located on the second attachment part 62. The lever 126 defines a notch N configured to releasably receive the locking pin 98. The lever 126 is movable between a locked position in which the locking pin 98 is received in the notch N, locking the retracting structure 64 in the extended position (FIGS. 9, 11 and 17-19) and a released position in which the locking pin 98 is spaced apart from the notch N and the retracting structure 64 is movable between the extended position and the stowed position (FIGS. 8 and 10).

The lower ends 120*a* of the upright members 120 define a pair of movement limiting projections that extend downward below the lower cross-member 124. The lower ends 120*a* are positioned such that the second beam 90 extends between the lower ends 120*a* and such that side-to-side movement of second beam 90 and the retracting structure 64 is limited by contact with the lower ends 120*a* (movement limiting projections).

A description of the door support structure 66 is now provided with reference to FIGS. 20-25. The door support structure 66 is coupled to the retracting structure 64 such that the door support structure 66 moves with the retracting structure 64 with respect to the guided cart attachment structures 60 and 62 between the extended position and the stowed position. The door support structure 66 is configured to support the sliding door 14 in a prescribed position with the retracting structure 64 in the extended position.

The door support structure 66 basically includes a base 130, a roller 132 and an elevated platform 134. The base 130 is depicted as a plate but can include an extension of the second end 90*d* of the second beam 90. The base 130 is fixedly and rigidly attached to the second beam 90 such that the door support structure 66 and the second beam 90 move together as a single structure. The base 130 includes a hollow sleeve 136 that extends upward from an upper surface of the base 130. The hollow sleeve 136 is rigidly fixed to the base 130 by, for example, welding or fasteners (not shown). The roller 132 is fixed to an underside of the base 130 and provides rolling support to the base 130 and the platform 134 as the retracting structure 64 moves between the extended position and the stowed position.

The platform 134 includes a lower shaft portion 140, a height adjustment mechanism 142 (FIG. 25), a disk shaped upper portion 144 and a retention member 146. The platform 134 is pivotally supported on an upper surface of the base 130 by the lower shaft portion 140. Specifically, the lower shaft portion 140 is free to rotate within the hollow sleeve 136 of the base 130.

Figure 25:
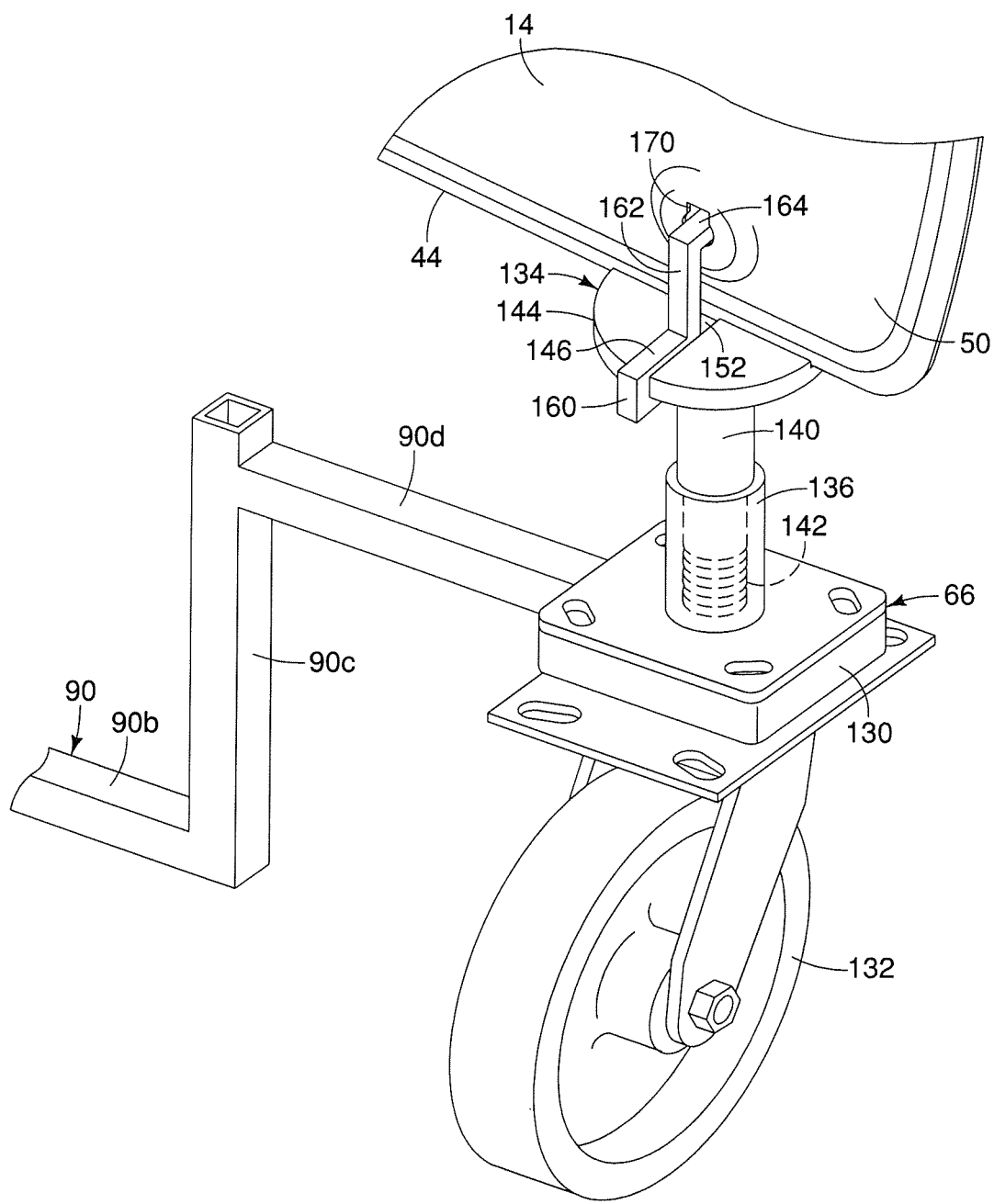
FIG. 25 is another perspective view of the platform of the door support structure similar to FIG. 20, showing the sliding door supported on the upper surface of the platform, with the retention member in the installed position and further showing details of a height adjustment mechanism in accordance with the one embodiment.

As shown in FIG. 25, the height adjustment mechanism 142 can be any of a variety of height adjustment configurations. For example, the height adjustment mechanism 142 can include threaded members that adjust the height of the platform 134 relative to the first support beam attachment part 60 and the second support beam attachment part 62 (the guided cart attachment structure). In the depicted embodiment, the height adjustment mechanism 142 is a series of removable washers or disks, inserted into the hollow sleeve 136, with the lower shaft portion 140 installed into the hollow sleeve 136 on top of the removable washers. The height adjustment mechanism 142 is located between the platform 134 and the roller 132.

Figure 20:
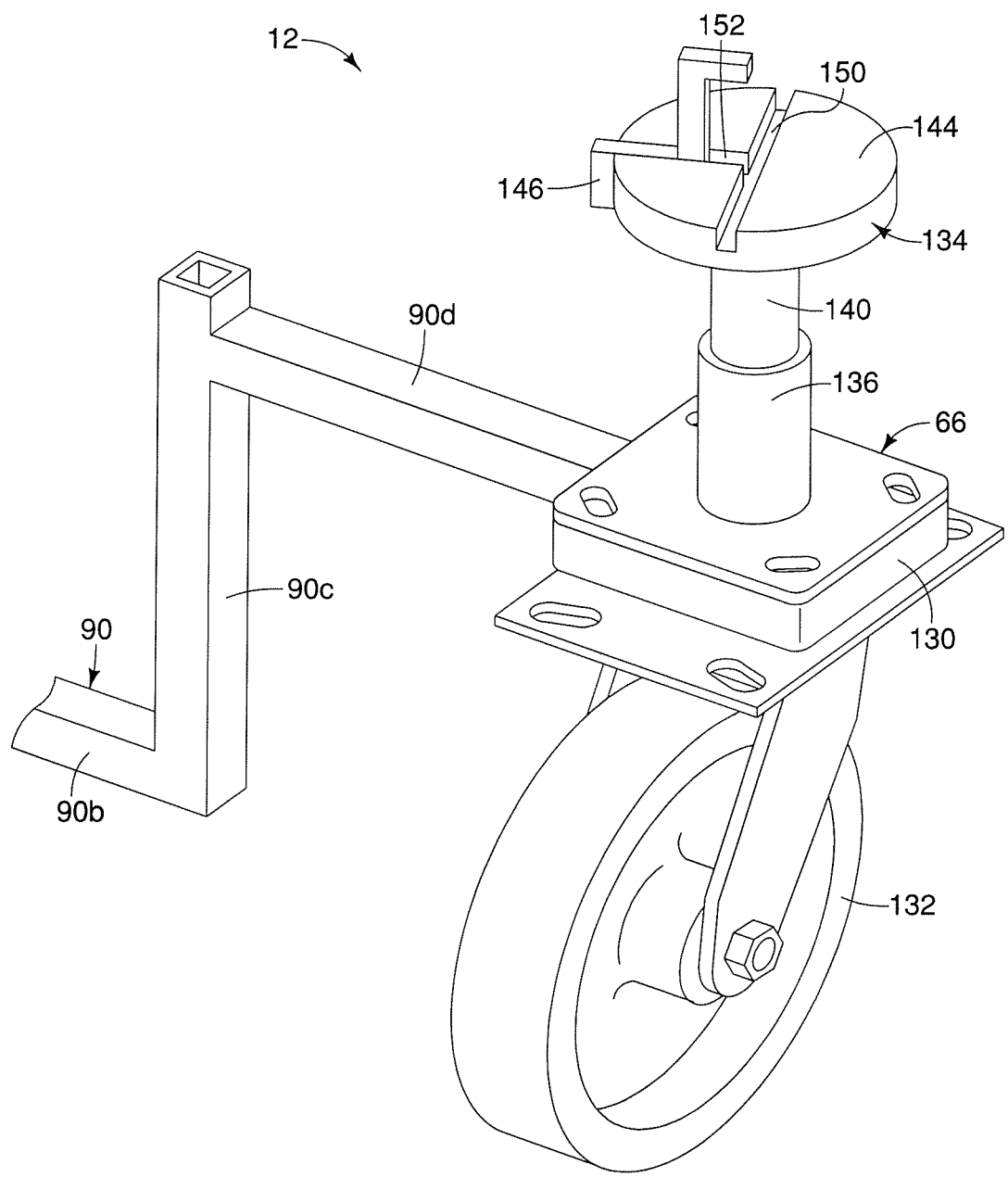
FIG. 20 is a perspective view of a door support structure of the sliding door assist device, showing details of a platform and a retention member in accordance with the one embodiment.
Figure 23:
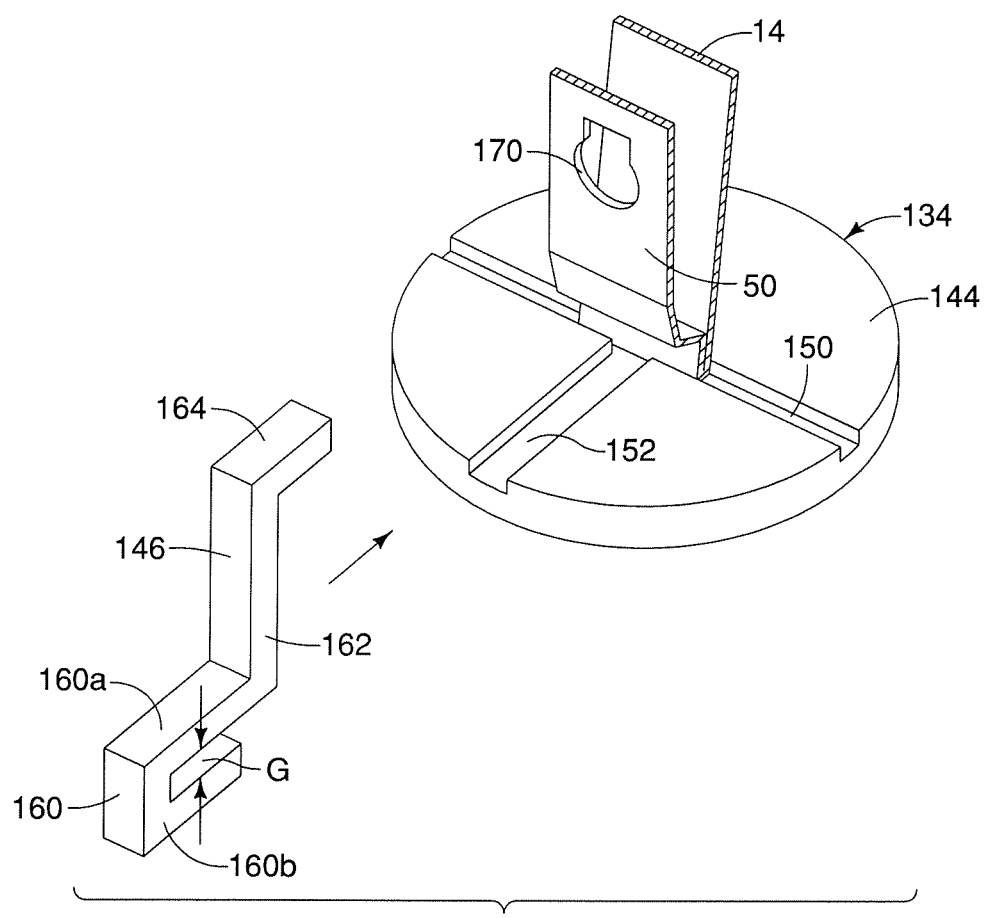
FIG. 23 is a perspective view of the platform of the door support structure, showing a cut-away portion of the lower corner of the sliding door being supported in a recess defined on an upper surface of the platform, with the retention member in an uninstalled position in accordance with the one embodiment.
Figure 24:
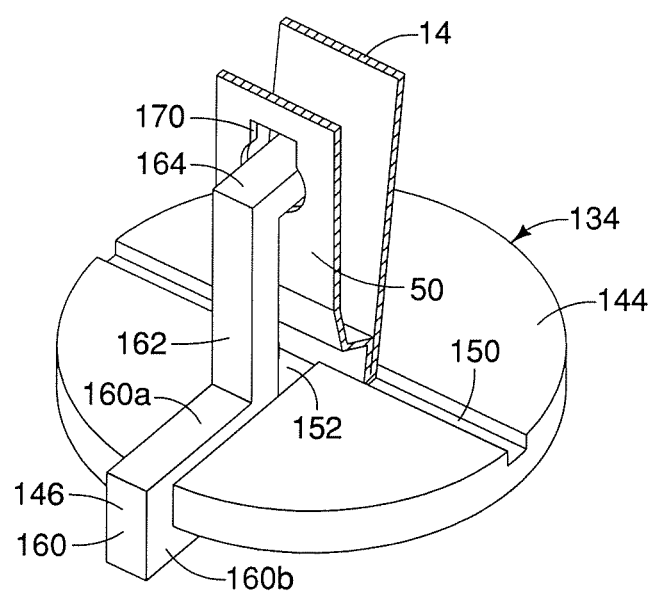
FIG. 24 is another perspective view of the platform of the door support structure similar to FIG. 23, showing the cut-away portion of the lower corner of the sliding door being supported in the recess defined on the upper surface of the platform, with the retention member in an installed position within another recess on the upper surface of the platform, retaining the sliding door to the platform and the door support structure in accordance with the one embodiment.

As shown in FIGS. 20, 23 and 24, an upper surface of the upper portion 144 of the platform 134 defines a plurality of recesses 150 and 152. The recess 150 extends from side-to-side and is dimensioned to receive lower edge 44 at the lower rear corner 50 of the sliding door 14. The recess 152 extends from an outer edge of an upper surface of the platform 134 inward along the upper surface of the upper portion 144. The recess 152 is dimensioned to receive a portion of the retention member 146.

The retention member 146 is removably coupled to the upper portion 144 of the platform 134. FIG. 23 shows the retention member 146 in an uninstalled position relative to the platform 134 and FIG. 24 shows the retention member 146 in an installed position on the platform 134. The retention member 146 includes an attachment portion 160, an upright portion 162 and an extension 164. The attachment portion 160 is basically a U-shaped section that is dimensioned such that an upper section 160a of the U-shape slides into the recess 152 and a lower section 160b of the U-shape extends under the upper portion 144 of the platform 134. A gap G between the upper and lower sections 160a and 160b of the attachment section 160 is preferably formed with a thickness that is approximately equal to the thickness of the upper portion 144 at the recess 152. Consequently, the attachment section 160 snuggly slides in position on the upper portion 144 of the recess 152.

The upright portion 162 extends between the attachment portion 160 and the extension 164. The extension 164 is dimensioned to fit into an aperture 170 formed in the sliding door 14. The aperture 170 is provided in the sliding door 14 for, for example, to receive an elastic cushioning element. In other words, the aperture 170 is not necessarily provided in the sliding door 14 to receive the extension 164 of the retention member 140, but rather is already a pre-designed feature of the sliding door 14. Hence, the extension 164 of the retention member 146 is dimensioned to fit in an opening or the aperture 170 that is already provided to the sliding door 14.

The connection between the extension 164 of the retention member 146 and the aperture 170 of the sliding door 14 serves to position and retain the lower rear corner 50 of the sliding door 14 relative to the first support beam attachment part 60 and the second support beam attachment part 62 (the guided cart attachment structure). Consequently, the door support structure 66 retains the sliding door 14 such that the overall body of the sliding door 14 defines an acute angle α with respect to a longitudinal axis of the support beam 32, as indicated in FIG. 3. Preferably, the acute angle α is maintained at approximately 35°.

Figure 21:
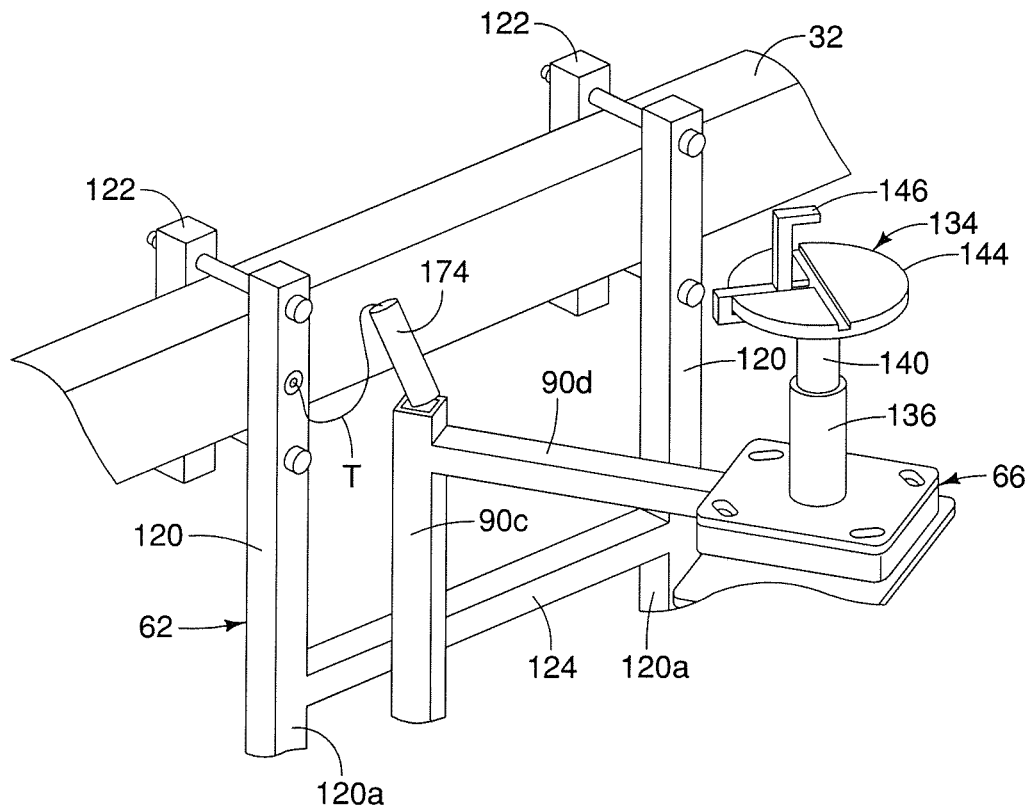
FIG. 21 is a perspective view of the door support structure and the second support beam attachment part of the guided cart attachment structure of the sliding door assist device, showing a stowing retainer tethered to the second support beam attachment part in accordance with the one embodiment.
Figure 22:
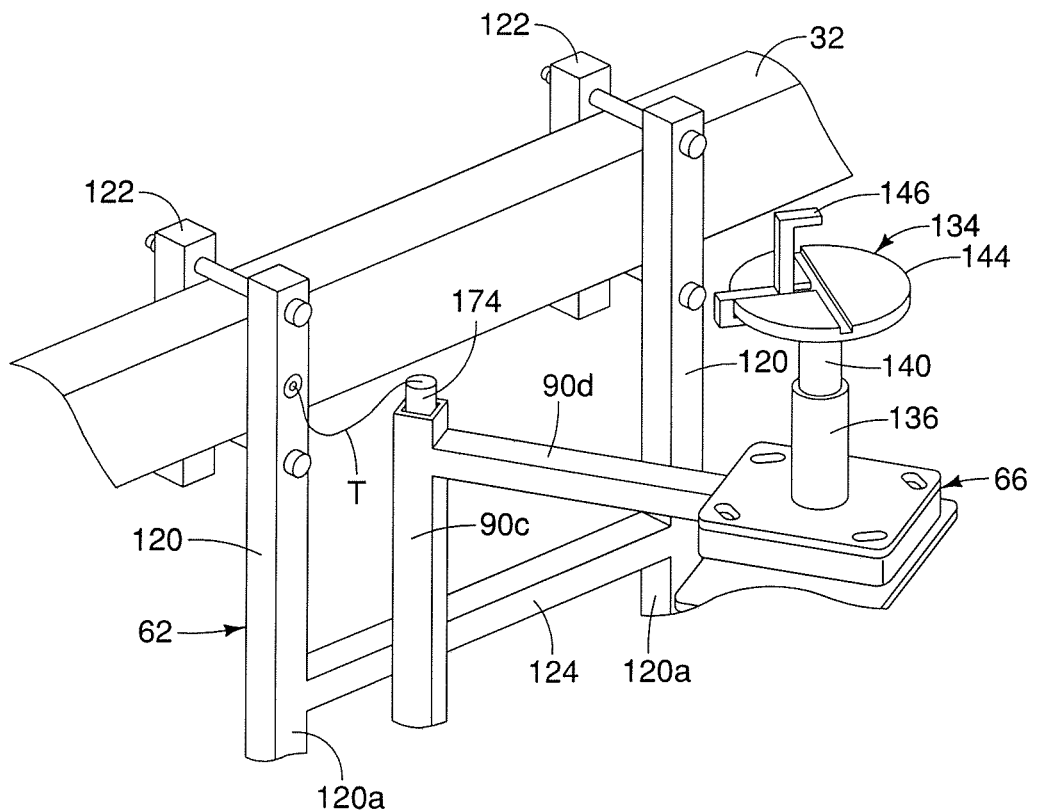
FIG. 22 is another perspective view of the door support structure and the second support beam attachment part similar to FIG. 21, showing the stowing retainer installed in a hollow interior of a beam connected to the door support structure thereby retaining the door support structure and the sliding door assist device in the retracted position in accordance with the one embodiment.

As shown in FIGS. 21 and 22, the sliding door assist device 12 also includes a stowing retainer 174. The stowing retainer 174 (a first part) is attached to the upright members 120 by a tether T. The tether T can be a plastic rope or chain that allows easy movement of the stowing retainer 174. The tether T can be merely tied around one of the upright members 120 of the second support beam attachment part 62, or can be fixed via a fastener to one of the upright members 120. The stowing retainer 174 is dimensioned to removably fit into a hollow interior of the upper end of the vertical section 90c of the second beam 90 (a second part), such that with the stowing retainer 174 (the first part) engaged with the vertical section 90c (the second part), the door support structure 66 is retained in the stowed position, and with the stowing retainer 174 (the first part) disengaged from the vertical section 90c (the second part), the door support structure 66 is movable between the extended position and the stowed position. As shown in FIGS. 21 and 22, the stowing retainer 174 is a pin member.

Figure 7:
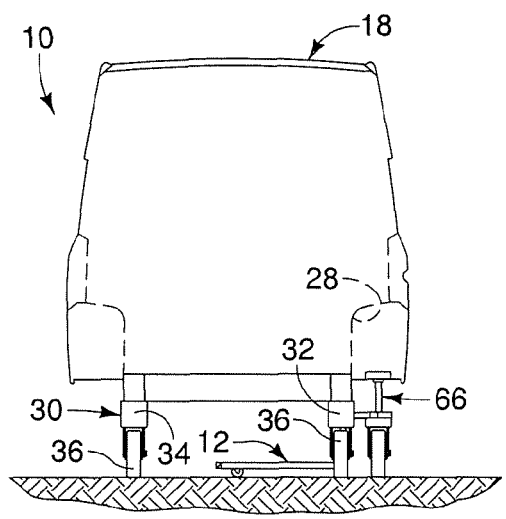
FIG. 7 is a rear view of the vehicle structure showing the sliding door fully installed with the sliding door assist device in a retracted position under the vehicle structure in accordance with the one embodiment.

The sliding door assist device 12 is also configured such that in the stowed position as shown in FIGS. 4 and 7, the door support structure 66 is located relative to the first support beam attachment part 60 and the second support beam attachment part 62 (the guided cart attachment structure) such that the door support structure 66 is supported within the wheel well 28 of the vehicle structure 18.

The various portions of the vehicle structure 18 are conventional components that are well known in the art. Since vehicle structures are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the sliding door assist device. Accordingly, these terms, as utilized to describe the present invention should be interpreted relative to a vehicle equipped with the sliding door assist device.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sliding door assist device comprising:
a guided cart attachment structure;
a retracting structure pivotally coupled to the guided cart attachment structure to move between an extended position and a stowed position with respect to the guided cart attachment structure; and
a door support structure coupled to the retracting structure such that the door support structure moves with the retracting structure with respect to the guided cart attachment structure between the extended position and the stowed position, the door support structure being configured to support a sliding door in a prescribed open position with the retracting structure in the extended position, the door support structure including a platform and a retention member, the platform having a horizontally extending surface that is configured to support a lower edge of the sliding door and the retention member being removably installed to the platform, the retention member including an extension located above the horizontal surface with the retention member being installed to the platform, the extension being configured to be received in an aperture formed in an inner panel of the sliding door.

2. The sliding door assist device according to claim 1, wherein
the platform includes a roller that supports the platform as the retracting structure moves between the extended position and the stowed position.

3. The sliding door assist device according to claim 1, wherein
the platform defines a recess dimensioned to receive the lower edge of the sliding door.

4. The sliding door assist device according to claim 1, wherein
the horizontally extending surface of the platform includes a recess that extends from an outer edge of an upper surface of the platform inward along the upper surface, and
the retention member includes a platform attachment portion spaced apart from the extension, the platform attachment portion including a first section removably inserted into the recess of the upper surface of the platform and a second section dimensioned to contact a lower surface of the platform with the first section disposed within the recess.

5. The sliding door assist device according to claim 1, wherein
the door support structure includes a height adjust mechanism that selectively adjusts a position of the platform relative to the guided cart attachment structure.

6. The sliding door assist device according to claim 5, wherein
the platform includes a roller that supports the platform as the retracting structure moves between the extended position and the stowed position, with the height adjust mechanism being located between the platform and the roller.

7. The sliding door assist device according to claim 1, wherein
the door support structure positions a rear corner of the sliding door relative to the guided cart attachment structure such that with the guided cart attachment structure attached to a support beam of an automatic guided cart, an overall body of the sliding door defines an acute angle with respect to a longitudinal axis of the support beam.

8. The sliding door assist device according to claim 7, wherein
the door support structure supports the sliding door such that the acute angle is maintained at approximately 35°.

9. The sliding door assist device according to claim 7, further comprising
a locking structure including a pin located on the retracting structure and a lever coupled to the support beam, the lever defining a notch configured to releasably receive the pin, the lever being movable between a locked position in which the pin is received in the notch locking the retracting structure in the extended position and a released position in which the pin is spaced apart from the notch and the retracting structure is movable between the extended position and the stowed position.

10. A sliding door assist device comprising:
a guided cart attachment structure including a first support beam attachment part;
a retracting structure pivotally coupled to the guided cart attachment structure to move between an extended position and a stowed position with respect to the guided cart attachment structure, the retracting structure including a first beam having a first end pivotally coupled to the first support beam attachment part by a first pivot arrangement for pivotal movement about a vertically oriented first pivot axis; and
a door support structure coupled to the retracting structure such that the door support structure moves with the retracting structure with respect to the guided cart attachment structure between the extended position and the stowed position, the door support structure being configured to support a sliding door in a prescribed open position with the retracting structure in the extended position.

11. The sliding door assist device according to claim 10, wherein
the retracting structure further includes a second beam having a first end pivotally coupled to the first beam by a second pivot arrangement that defines a second pivot axis, the second beam having a second end that is connected to the door support structure.

12. The sliding door assist device according to claim 11, wherein
the first and second pivot arrangements have the first and second pivot axes arranged parallel to one another.

13. The sliding door assist device according to claim 11, wherein
the second beam includes at least one caster located closer to the first end of the second beam than to the second end of the second beam for at least providing rolling support to the second beam.

14. The sliding door assist device according to claim 10, wherein
the guided cart attachment structure includes a second support beam attachment part, the second support beam attachment part including a pair of movement limiting projections with a portion of the retracting structure extending therebetween such that side-to-side movement of the retracting structure is limited by contact with the movement limiting projections.

15. The sliding door assist device according to claim 14, further comprising
a locking structure including a pin located on the retracting structure and a lever located on the second attachment part, the lever defining a notch configured to releasably receive the pin, the lever being movable between a locked position in which the pin is received in the notch locking the retracting structure in the extended position and a released position in which the pin is spaced apart from the notch and the retracting structure is movable between the extended position and the stowed position.

16. The sliding door assist device according to claim 14, further comprising a stowing retainer including a first part connected to the second support beam attachment part and a second part connected to the door support structure, such that with the first part engaged with the second part, the door support structure is retained in the stowed position and with the first part disengaged from the second part, the door support structure is movable between the extended position and the stowed position.

17. The sliding door assist device according to claim 16, wherein the first part of the stowing retainer includes a pin member and the second part defines an opening, the pin member being dimensioned to be removably fitted into the opening.

18. The sliding door assist device according to claim 1, wherein the door support structure is located relative to the guided cart attachment structure such that the door support structure is supported within a wheel well of a vehicle body structure with the door support structure in the stowed position.

19. A sliding door assist device comprising:

a guided cart attachment structure;

a retracting structure pivotally coupled to the guided cart attachment structure to move between an extended position and a stowed position with respect to the guided cart attachment structure;

a door support structure coupled to the retracting structure such that the door support structure moves with the retracting structure with respect to the guided cart attachment structure between the extended position and the stowed position, the door support structure being configured to support a sliding door in a prescribed open position with the retracting structure in the extended position, the door support structure further positions a rear corner of the sliding door relative to the guided cart attachment structure such that with the guided cart attachment structure attached to a support beam of an automatic guided cart, an overall body of the sliding door defines an acute angle with respect to a longitudinal axis of the support beam; and a locking structure including a pin located on the retracting structure and a lever coupled to the support beam, the lever defining a notch configured to releasably receive the pin, the lever being movable between a locked position in which the pin is received in the notch locking the retracting structure in the extended position and a released position in which the pin is spaced apart from the notch and the retracting structure is movable between the extended position and the stowed position.

* * * * *